May 26, 1931. C. WAZLAVEK 1,807,266
GRAB
Filed July 14, 1930 2 Sheets-Sheet 1

Carl Wazlavek
INVENTOR.
BY Stanley Burch
ATTORNEY.

May 26, 1931.  C. WAZLAVEK  1,807,266
GRAB
Filed July 14, 1930  2 Sheets-Sheet 2

Carl Wazlavek
INVENTOR.

BY J. Stanley Birch
ATTORNEY.

Patented May 26, 1931

1,807,266

UNITED STATES PATENT OFFICE

CARL WAZLAVEK, OF MASSILLON, OHIO, ASSIGNOR OF ONE-FOURTH TO WILLIAM B. FISCHER, OF MASSILLON, OHIO

GRAB

Application filed July 14, 1930. Serial No. 467,903.

The present invention relates to lifting devices of the character generally known as a grab, and primarily designed for lifting bodies of rectangular contour, such as a stack of sheet metal plates, although a general application of the invention is contemplated by the claims.

One of the objects of the present invention resides in the novel construction of means for controlling the relatively movable gripping jaws of the device, to insure effective engagement thereof with the object to be lifted, irrespective of its size, and to prevent slipping of the load from the jaws under any circumstance.

In carrying out the invention I comprehend a structure wherein the gripping jaws are moved toward and away from each other by motor-operated means, and effectively held against casual separation from the load after they have gripped the latter.

More specifically stated, the invention provides motor-operated gripping jaws, in conjunction with an automatically operable brake mechanism, which prevent spreading or separation of the jaws after they have effectively engaged the load.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views and wherein.

Figure 1:
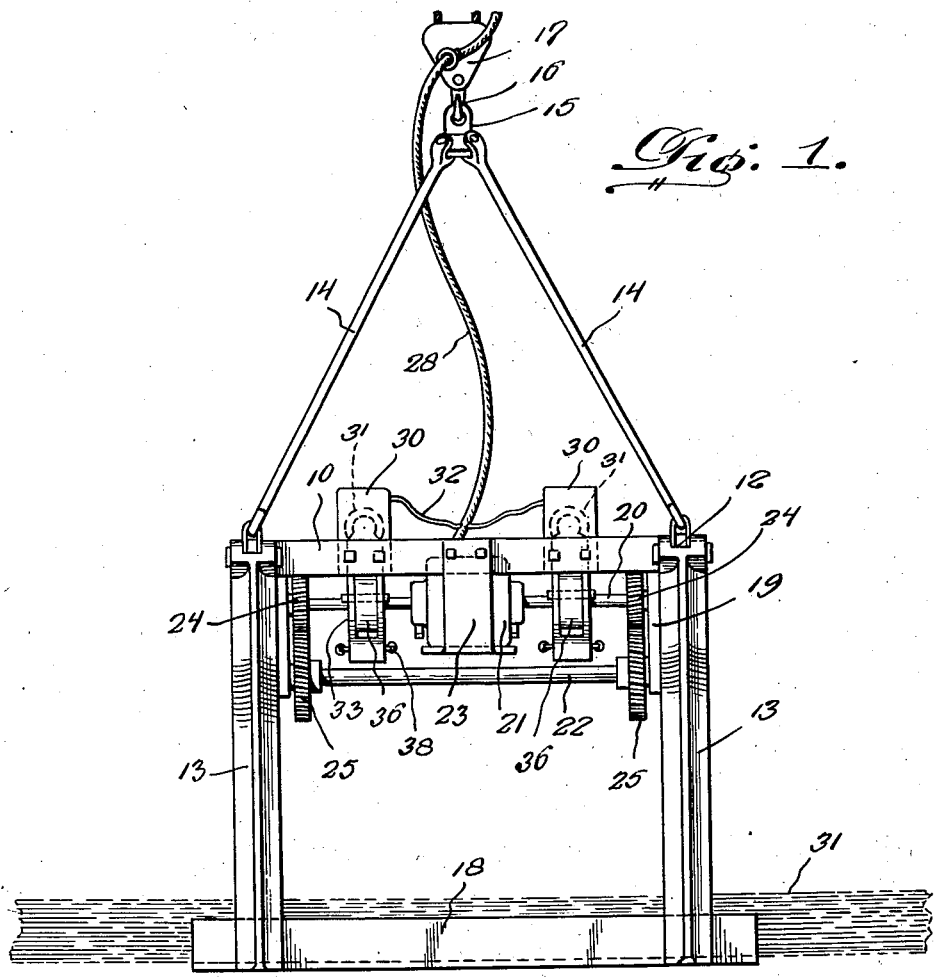
Figure 1 is a side elevation of the invention.
Figure 3:
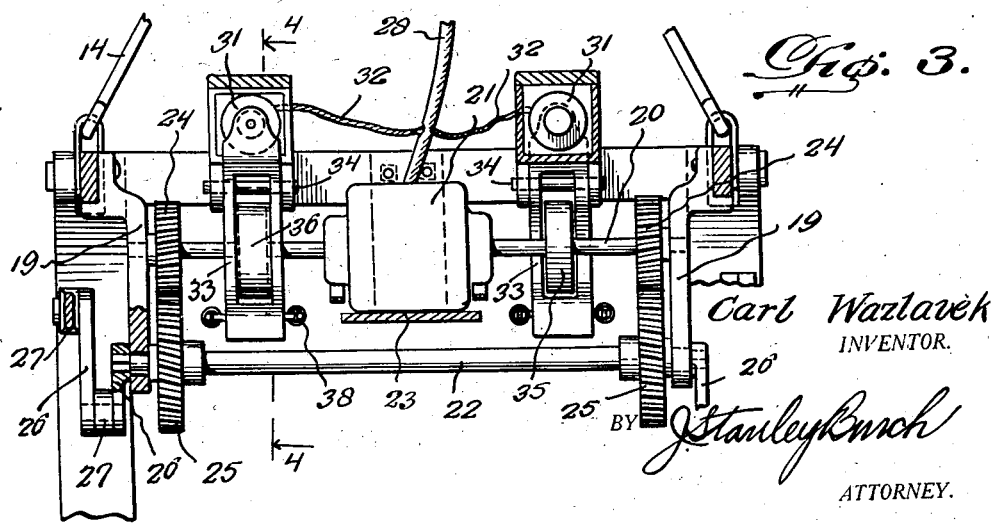
Figure 3 is a sectional view on line 3—3 of Figure 2.
Figures 2, 4:
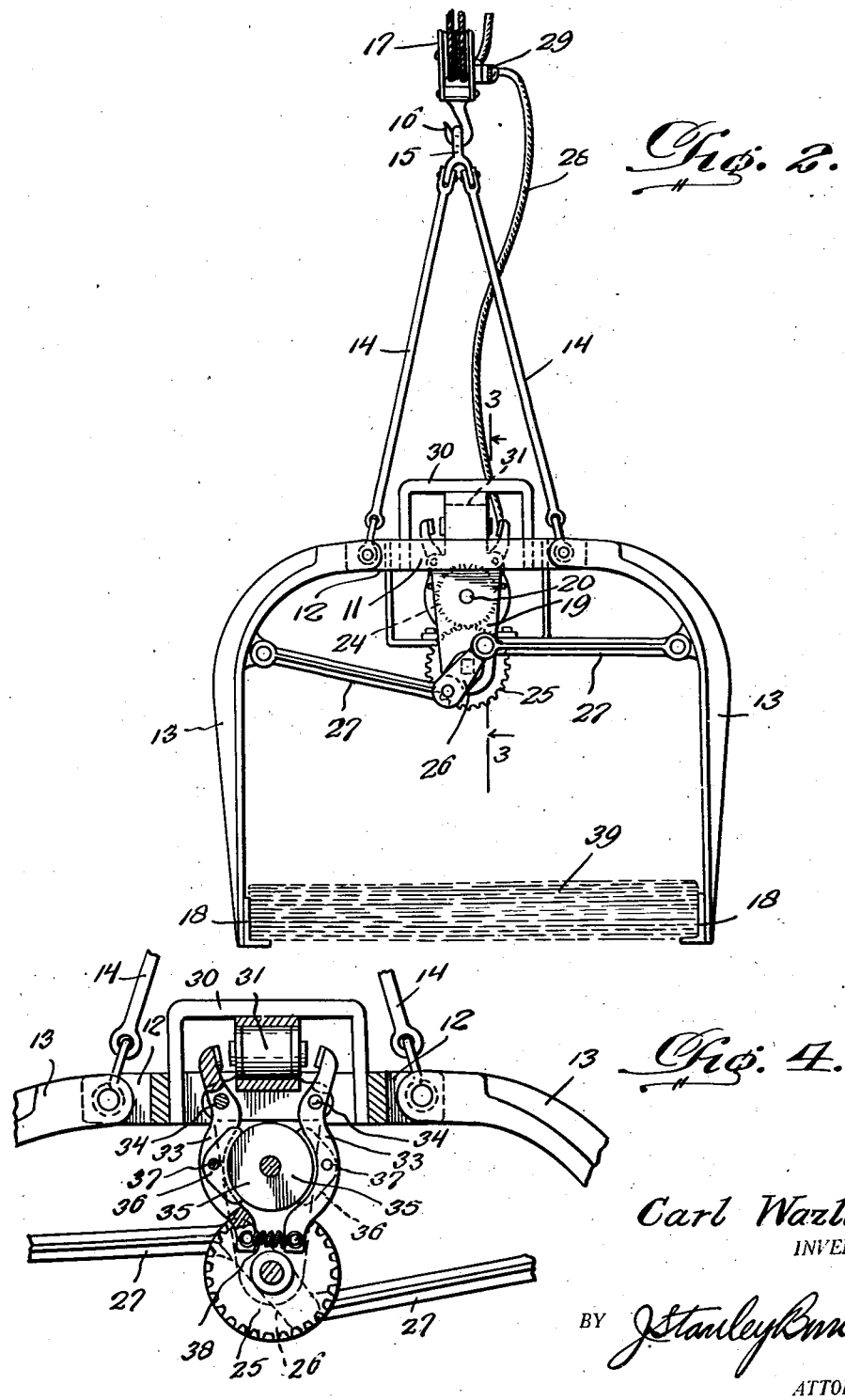
Figure 2 is an end elevation.
Figure 4 is a sectional view on line 4—4 of Figure 3.

Referring to the drawings in detail, the lifting device comprises a frame including spaced parallel side members 10 connected by the end members 11. The end members project a slight distance beyond the side members as at 12 and are received by the bifurcated extremities of the gripping jaws 13, which are pivoted on the end members as illustrated. The entire structure is suspended by rods 14 carried by a yoke 15 having an eye to receive the hook 16 of a suitable hoist 17, by means of which the device is raised or lowered. The gripping jaws are used in pairs, and each pair is connected by a gripping bar 18 of angle iron as illustrated.

Depending from the end members 11 of the frame are bracket arms 19 in which are journaled the shaft 20 of a reversible electric motor 21, and a shaft 22 operatively connected with the respective pairs of gripping jaws 13. The motor 21 is suitably mounted upon the frame by a bracket 23, and secured to the motor shaft are gears 24 meshing with gears 25 carried by the shaft 22. Each end of the shaft 22 is connected to the adjacent pairs of jaws 13 by double throw links 26 and 27 respectively, so that as the shaft 22 is rotated, the jaws are moved toward or away from each other, depending of course, upon the direction of rotation of said shaft. The current from the motor is carried through a wire 28 and is of course controlled by a suitable reversible switch (not shown). As illustrated the wire 28 is provided with a plug 29 which can be easily and conveniently connected with or removed from the hoist 17 as the occasion may require, and consequently the wire can be disconnected to permit the hoist to be used independently of the lifting device.

Carried by the side members 10 of the frame are spaced inverted U-shaped brackets 30, each of which supports a magnet 31 connected in circuit with the motor by the wires 32 leading from the wire 28. A pair of brake shoe supporting members 33 are pivoted upon the frame as at 34 and are suitably curved about brake drums 35 carried by the motor shaft 20. The members 33 are longitudinally slotted to receive brake shoes 36 which are pivoted therein as at 37. The lower ends of the members 33 are connected by a strong spring 38 which normally holds the brake shoes applied to their respective drums 35, and the upper ends of said members 33 spaced from the magnets.

In practice, the motor is operated to rotate the shaft 22 in a direction to spread or separate the gripping jaws 13, and when the current is turned on to the motor, the magnets are simultaneously energized, thereby attracting the member 33 and releasing the brake shoes. The device is then lowered over the load to be lifted, herein indicated at 39, whereupon the motor is reversed to move the jaws into gripping relation, during which operation the brake shoes remain inactive. When the jaws have effectively engaged the load, irrespective of its dimension, the jaws are brought to rest, and the motor can be normally stopped, although it will be stalled and thereby rendered inactive. Obviously when the magnets are thus de-energized, the spring 38 functions to return the members 33 to their normal positions, thereby applying the brakes to the drums 35, and effectively holding the shaft 20 against retrograde movement, and obviate slipping or dropping of the load as the device is elevated. The device is very simple in construction, easy to manipulate, and very effective and positive in operation for the purpose intended.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim as new is:

1. In a lifting device of the character described, spaced pairs of gripping jaws mounted for movement toward and away from each other, motor-actuated means for operating said jaws, and brake mechanism for holding said jaws immovable in gripping relation with the load, and releasing said jaws at a predetermined interval.

2. In a lifting device of the character described, a supporting frame, spaced pairs of gripping jaws mounted thereon for movement toward and away from each other, a motor supported by said frame, means actuated from the motor for moving said jaws toward and away from each other, and a brake mechanism to hold said jaws immovable in gripping relation with the load, and to release said jaws as the latter are moved away from each other.

3. In a lifting device of the character described, a supporting frame, spaced pairs of gripping jaws mounted thereon for movement toward and away from each other, a motor supported by the frame and including a shaft, an operating shaft mounted for rotation and connected with the jaws to control the movements thereof, means for rotating the operating shaft in either direction from the motor shaft, and brake mechanism for holding the jaws immovable when in gripping relation with the load and releasing said jaws when it is desired to move the latter away from each other.

4. In a lifting device of the character described, a supporting frame, spaced pairs of gripping jaws mounted thereon for movement toward and away from each other, a reversible electric motor supported by the frame and including a shaft, means actuated from the shaft for controlling the movements of said jaws, brake drums carried by the shaft, brake shoes arranged at either side of each drum, and electrically controlled means for moving said shoes into effective engagement with the drums as said jaws assume their final gripping position with relation to the load, and to release said shoes when the jaws are moved away from each other.

5. In a lifting device of the character described, a supporting frame, spaced pairs of gripping jaws mounted thereon for movement toward and away from each other, a reversible electric motor supported by the frame and including a shaft, means for controlling the movements of the jaws and actuated from said shaft, brake drums carried by the shaft, a pair of brake shoes arranged at either side of each drum, and means for operating said shoes, including magnets arranged in circuit with the motor to hold said shoes inactive while the jaws are in motion, and to effectively hold said jaws against movement when in gripping relation with the load.

6. In a lifting device of the character described, a supporting frame, spaced pairs of gripping jaws mounted thereon for movement toward and away from each other, a reversible electric motor supported by the frame and including a shaft, means actuated from the shaft for controlling the movements of said jaws, brake drums carried by said shaft, a pair of brake shoe carrying members pivoted at either side of each drum, a brake shoe pivoted within each of said members, and electrically controlled means for operating said shoes, including magnets located between each pair of said members and utilized to move the shoes to inactive position while the motor is in operation, and yieldable means connecting said members to automatically apply the brakes just as soon as the motor ceases to operate.

7. In a lifting device of the character described, the combination with a hoist, of a supporting frame suspended from the hoist and detachably connected therewith, spaced pairs of gripping jaws mounted on said frame for movement toward and away from each other, a reversible electric motor supported by the frame and including a shaft, means actuated from said shaft for controlling the movements of said jaws, a lead wire for the motor having detachable connection with the hoist, whereby the latter can be used independently of the lifting device, brake drums carried by said shaft, brake shoes movably mounted on either side of each drum, electrically controlled means for moving said shoes to inactive position while the motor is in operation, and means for moving said shoes into effective engagement with their respective drums just as soon as the current is cut off to the motor.

In testimony whereof I affix my signature.

CARL WAZLAVEK.